US011100646B2

(12) United States Patent
Vora et al.

(10) Patent No.: US 11,100,646 B2
(45) Date of Patent: Aug. 24, 2021

(54) FUTURE SEMANTIC SEGMENTATION PREDICTION USING 3D STRUCTURE

(71) Applicant: Google LLC, Mountain View, CA (US)

(72) Inventors: Suhani Vora, Mountain View, CA (US); Reza Mahjourian, Mountain View, CA (US); Soeren Pirk, Palo Alto, CA (US); Anelia Angelova, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 16/562,819

(22) Filed: Sep. 6, 2019

(65) Prior Publication Data

US 2021/0073997 A1    Mar. 11, 2021

(51) Int. Cl.
*G06T 7/00* (2017.01)
*G06T 7/11* (2017.01)
*G06T 7/246* (2017.01)
*G06T 7/55* (2017.01)
(Continued)

(52) U.S. Cl.
CPC ............ *G06T 7/11* (2017.01); *G06K 9/00765* (2013.01); *G06N 3/08* (2013.01); *G06T 7/248* (2017.01); *G06T 7/55* (2017.01); *G06T 2207/10016* (2013.01); *G06T 2207/10028* (2013.01); *G06T 2207/20084* (2013.01); *G06T 2207/30244* (2013.01)

(58) Field of Classification Search
CPC ... G06T 7/11; G06T 7/248; G06T 7/55; G06T 2207/30244; G06T 2207/20084; G06T 2207/10028; G06T 2207/10016; G06K 9/00765; G06N 3/08
See application file for complete search history.

(56) References Cited

U.S. PATENT DOCUMENTS

2019/0279383 A1* 9/2019 Angelova ............. G06T 15/205
2020/0302612 A1* 9/2020 Marrero ............... G06K 9/6272
2020/0349722 A1* 11/2020 Schmid ..................... G06T 7/11

OTHER PUBLICATIONS

Bryavan et al., "SE3-Nets: Learning rigid body motion using deep neural networks", IEEE International Conference on Robotics and Automation (ICRA), 2017, 173-180.
(Continued)

*Primary Examiner* — Chan S Park
*Assistant Examiner* — Claude Noel Y Zanetsie
(74) *Attorney, Agent, or Firm* — Fish & Richardson P.C.

(57) ABSTRACT

A method for generating a predicted segmentation map for potential objects in a future scene depicted in a future image is described. The method includes receiving input images that depict a same scene; processing a current input image to generate a segmentation map for potential objects in the current input image and a respective depth map; generating a point cloud for the current input image; processing the input images to generate, for each pair of two input images in the sequence, a respective ego-motion output that characterizes motion of the camera between the two input images; processing the ego-motion outputs to generate a future ego-motion output; processing the point cloud of the current input image and the future ego-motion output to generate a future point cloud; and processing the future point cloud to generate the predicted segmentation map for potential objects in the future scene depicted in the future image.

29 Claims, 3 Drawing Sheets (51) Int. Cl.
*G06K 9/00* (2006.01)
*G06N 3/08* (2006.01)

(56) References Cited

OTHER PUBLICATIONS

Chen et al., "DeepLab: Semantic Image Segmentation with Deep Convolutional Nets, Atrous Convolution, and Fully Connected CRFS", IEEE Transaction on Pattern Analysis and Machine Intelligence, 2018, 40(4):834-848.
Chollet, "Xception: Deep Learning with Depthwise Separable Convolutions", IEEE Conference on Computer Vision and Pattern Recognition (CVPR), 2017, 1251-1258.
Cordts et al., "The Cityscapes Dataset for Semantic Urban Scene Understanding", IEEE Conference on Computer Vision and Pattern Recognition (CVPR), 2016, 3213-3223.
Fouhey et al., "Predicting Object Dynamics in Scenes", IEEE Conference on Computer Vision and Pattern Recognition (CVPR), 2014, 2019-2026.
He et al., "Deep Residual Learning for Image Recognition", IEEE Conference on Computer Vision and Pattern Recognition (CVPR), 2016, 770-778.
Hoai et al., "Max-margin early event detectors", International Journal of Computer Vision, Apr. 2014, 107(2):191-202.
Hochreiter et al., "Long short-term memory", Neural Computation, Nov. 1997, 9(8):1735-1780.
Jin et al., "Video scene parsing with predictive feature learning", IEEE International Conference on Computer Vision (ICCV), 2017, 5580-5588.
Kalchbrenner et al., "Video Pizel Networks", arXiv:1610.00527v1, Oct. 3, 2016, 16 pages.
Kitani et al., "Activity Forecasting", European Conference on Computer Vision, 2012, 201-214.
Lan et al., "A Hierarchical Representation for Future Action Prediction", European Conference on Computer Vision, 2014, 689-704.
Luc et al., "Predicting Deeper Into the Future of Semantic Segmentation", IEEE International Conference on Computer Vision (ICCV), 2017, 648-657.
Mahjourian et al., "Geometry based next frame prediction from monocular video", IEEE Intelligent Vehicles Symposium (IV), 2017, 1700-1707.
Mahjourian et al., "Unsupervised Learning of Depth and Ego Motion From Monocular Video Using 3D Geometric Constraints", IEEE Conference on Computer Vision and Pattern Recognition (CVPR), 2018, 5667-5675.
Mathieu et al., "Deep Multi Scale Video Prediction Beyong Mean Square Error", arXiv:1511.05440v6, Feb. 26, 2016, 14 pages.
Pei et al., "Parsing video events with goal Inference and intent prediction", IEEE International Conference on Computer Vision (ICCV), 2011, 487-494.
Ranzato et al., "Video (Language) Modeling: A Baseline for Generative Models of Natural Videos", arXiv:1412.6604v5, May 4, 2016, 15 pages.
Shalev-Shwartz et al., "Long-term Planning by Short-term Prediction", arXiv:1602.01580v1, Feb. 4, 2016, 9 pages.
Shalev-Shwartz et al., "On the sample complexity of end to end training vs. semantic abstraction training", arXiv:1604.06915v1, Apr. 23, 2016, 4 pages.
Srivastava et al., "Unsupervised Learning of Video Representations using LSTMs", 32nd International Conference on Machine Learning (ICML), 2015, 10 pages.
Villegas et al., "Decomposing motion and content for natural video sequence prediction", arXiv:1706.08033v2, Jan. 8, 2018, 22 pages.
Zhou et al., "Unsupervised Learning of Depth and Ego Motion From Video", IEEE Conference on Computer Vision and Pattern Recognition (CVPR), 2017, 1851-1858.

* cited by examiner

FUTURE SEMANTIC SEGMENTATION PREDICTION USING 3D STRUCTURE

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

SUMMARY

This specification describes a system implemented as computer programs on one or more computers that can generate a prediction of future semantic segmentation of a future image.

Particular embodiments of the subject matter described in this specification can be implemented so as to realize one or more of the following advantages. The subject matter described in this specification is generally directed to a future segmentation prediction system that utilizes a geometry-based approach that has many advantages over prior approaches to predict future image segmentations from a sequence of input images (e.g., a sequence of frames of a video such as a monocular video). Prior approaches attempt to forecast a future image (e.g., a future frame) from past images (e.g. past frames), centering around prediction of RGB pixel values. However, prediction in RGB pixel space quickly leads to blurring effects as RGB pixel intensities are difficult to predict precisely. In contrast, the future segmentation prediction system described herein predicts a future image segmentation from a sequence of input images by leveraging the 3D structure of the scene as depicted in the input images. The system includes learnable neural networks capable of predicting pixel-wise scene semantic labels, depth, and ego-motion of adjacent images. Further, the system includes a future ego-motion prediction neural network, which is a recurrent neural network based model capable of predicting future ego-motion trajectory as a function of a series of past ego-motion steps. By leveraging 3D structure in the model, the system is able to achieve accuracy improvements in predicting future segmentations of unseen future images, relative to a segmentation-only baseline as well as a state-of-the-art result. Using the predicted future segmentations, the system can generate more accurate and realistic future images with significantly higher quality and sharpness compared to existing methods.

In addition, the future segmentation prediction techniques described herein leverage 3D depth and ego-motion neural networks to obtain data for training the future ego-motion prediction neural network for the purposes of predicting future segmentations. These neural networks are learned using an unsupervised method from a sequence of input images, thus no additional supervision or sensors are necessary. This ensures that training data for the training is readily available, i.e., because large quantities of unlabeled monocular video can be easily gathered during the course of normal operation of an agent.

As the future segmentation prediction system can process a sequence of images that are video frames separated by multiple time intervals to generate a predicted segmentation, the system can achieve competitive performance to the state-of-the-art and is capable of predicting future segmentations at larger time horizons.

The techniques in this disclosure may be used in real-world applications where predicting the future to anticipate the outcome of events and actions is critical, for example, in autonomous agents such as vehicles and robotics. Driverless vehicles and robots can, for example, be enabled to predict the consequences of movements or other actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a future segmentation prediction system implemented as computer programs on one or more computers that is configured to receive a sequence of input images captured by a camera and to process the sequence of input images to generate predicted segmentations of future images that would be, i.e., that are likely to be, captured by the camera in the future.

Figure 1:
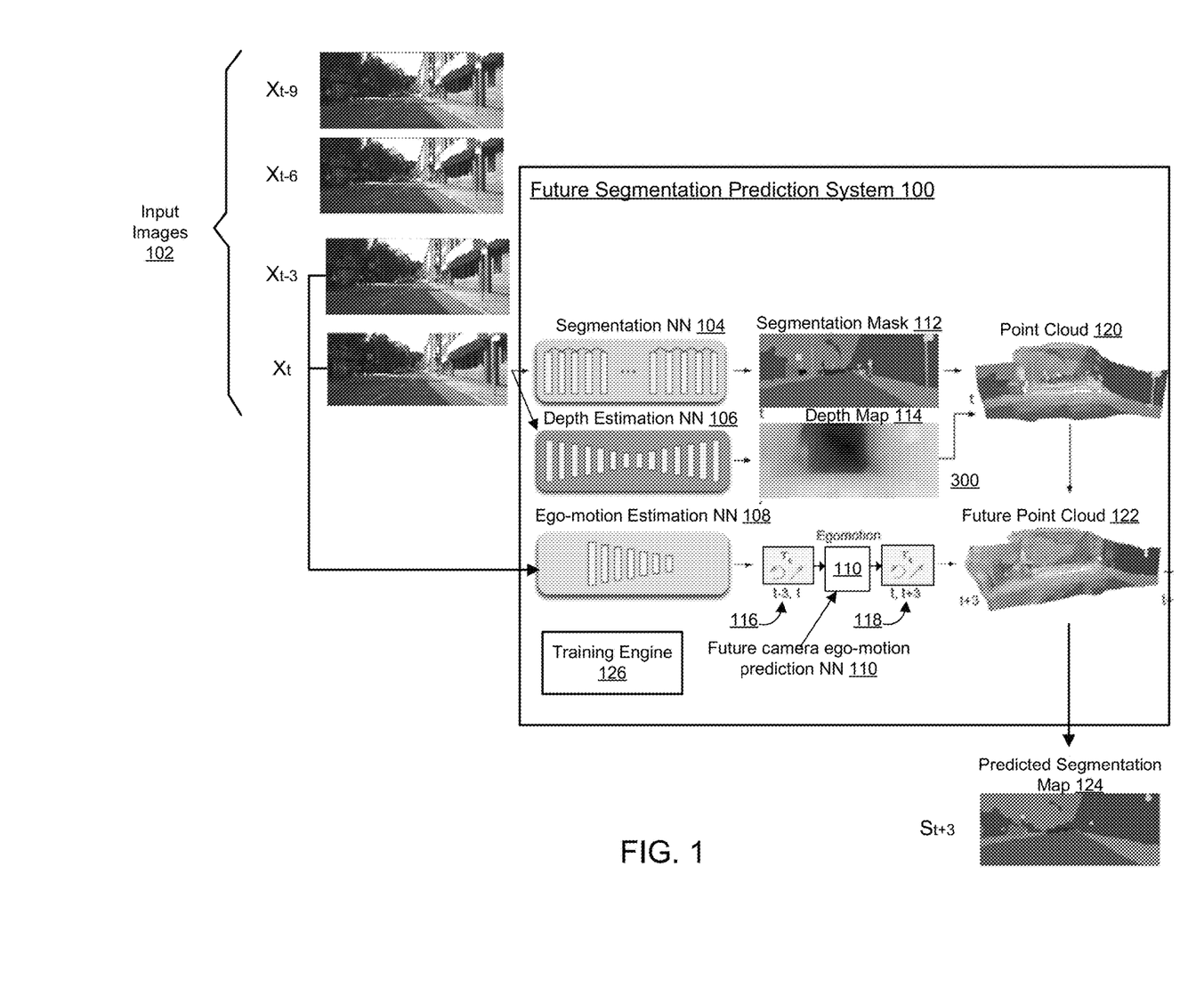
FIG. 1 is a block diagram of an example of a future segmentation prediction system.

FIG. 1 shows an example future segmentation prediction system 100. The system 100 is an example of a system implemented as computer programs on one or more computers in one or more locations, in which the systems, components, and techniques described below can be implemented.

In general, the future segmentation prediction system 100 is configured to receive a sequence of input images 102 and to process the sequence of input images 102 to generate a predicted segmentation map 124 of a future image. The sequence of input images 102 includes a current input image and one or more input images preceding the current image in the sequence.

In an example, the sequence of input images 102 may include frames of video being captured by the camera of a robotic agent and a future image may be a frame that will be captured by the camera of the robotic agent in the future. As another example, the sequence of input images 102 may include frames of a monocular video captured using a camera of a mobile device (e.g., by a camera of a hand-held commercial phone while a user of phone is riding a bicycle), and a future image may be a frame that will be captured by the camera of the mobile device in the future.

A future image can be, for example, an image that immediately follows the current image in the sequence or an image that will be separated by multiple images from the current image (e.g., an image that is three, five, nine, or ten images after the current image in the sequence) if the camera continues to capture images at the same rate.

In some implementations, the sequence of images 102 may include consecutive frames of a video. However, the sequence 102 does not necessarily have to include all of the frames from the video. For example, in some implementations, the sequence 102 may include every other frame of the video.

In some other implementations, to predict future segmentations at large time horizons, the system 100 can receive input images that are frames of video separated by a fixed number of time intervals, in which the fixed number is greater than one. A time interval is the duration between the time step when a given frame of the video is captured and the time step when a next frame immediately following the given frame is captured by the camera, given that the camera captures the frames of the video at the same frame rate (e.g., 24, 30, or 60 frames per second) and that the camera captures one frame at each time step. For example, the system 100 can receive a sequence of input images that are frames of video separated by three time intervals, e.g., $\{X_{t-9}, X_{t-6}, X_{t-3}, X_t\}$, where $X_{t-9}$, for example, denotes an image X taken at time step t−9. Given this sequence of input images, the system 100 can predict segmentation maps for one or more future frames (e.g., frames $X_{t+3}, X_{t+6}, X_{t+9}, X_{t+12}, \ldots$). In some cases, the system 100 may decide which segmentation map needs to be predicted based on whether a short-term prediction (e.g., 3 frames head of time), mid-term prediction (e.g., 6-9 frames ahead of time), or long-term prediction (e.g., 12-15 frames ahead of time) is needed.

To generate a prediction of a segmentation map for a future image, the future segmentation prediction system 100 includes an segmentation neural network 104, a depth estimation neural network 106, an ego-motion estimation neural network 108, and a future ego-motion prediction neural network 110.

The system 100 processes the current input image using the segmentation neural network 104 to generate a segmentation map for potential objects in the current input image.

The segmentation neural network 104 is configured to process the current input image to generate a segmentation map for potential objects in the current input image in accordance with current values of segmentation parameters of the segmentation neural network 104.

For example, as shown in FIG. 1, the system 100 receives a sequence of input images $\{X_{t-9}, X_{t-6}, X_{t-3}, X_t\}$ and aims to predict a segmentation map $S_{t+3}$ for a future image $X_{t+3}$. The segmentation neural network 104 processes current image $X_t$ in the sequence to generate a segmentation map 112.

A segmentation map of an input image includes, for each pixel of a plurality of pixels in the input image, an estimated probability distribution over a predefined number of object classes that represents, for each predefined object class, a respective probability that the pixel belongs to the predefined object class. For example, an segmentation map S of an input image can be specified as a C-channel one-hot map $S^{ijc}$ where C is the number of object classes, $c \in \{1, \ldots, C\}$, and i,j represent coordinates of pixels and are iterating over all pixel locations in the input image. The segmentation map S assigns the value 1 to an object class with the highest probability that a pixel at coordinates i, j belongs to that object class and assigns the value 0 to all other object classes. For the sake of simplicity, in the following description, the c superscript is omitted and $S^{ij}$ is used to refer to the entire one-hot segmentation vector of size C at coordinates i,j. A time subscript t, e.g. $S_t^{ij}$, can be used to refer to the one-hot segmentation vector at time t.

In some implementations, the segmentation neural network 104 includes one or more convolutional neural network layers. For example, the segmentation neural network may include a 1×1 convolutional neural network layer followed by one or more sigmoid activation neural network layers. Other examples of segmentation neural networks are described in L. C. Chen, G. Papandreou, I. Kokkinos, K. Murphy, and A. L. Yuille. DeepLab: Semantic image segmentation with deep convolutional nets, atrous convolution, and fully connected CRFs. IEEE Trans. Pattern Anal. Mach. Intell., 40(4):834-848, April 2018.

The system 100 further processes the current input image using a depth estimation neural network 106 to generate a depth map for the current input image.

The depth estimation neural network 106 is configured to process the current input image to generate a depth map that characterizes a depth of the current image in accordance with current values of depth parameters of the depth estimation neural network 106. For example, as shown in FIG. 1, the depth estimation neural network 106 is configured to process the current image $X_t$ to generate a respective depth map 114.

A depth map generated for a given image includes a predicted depth value for each pixel of multiple pixels in the given image. The depth value of a pixel is a representation of a perpendicular distance between (i) a plane in which the given image is recorded, and (ii) a scene depicted at the pixel (for example, the actual or virtual location of an object or part of an object that the pixel depicts). The plane in which the image is recorded may be a focal plane, for example, the focal plane of a camera of a robotic agent or the focal plane of a camera of a mobile device. In some implementations, the depth estimation neural network includes one or more convolutional neural network layers.

Given the segmentation map and the depth map of the current input image, the system 100 generates a point cloud 120 for the current input image. The point cloud 120 is a 3-dimensional (3D) structure representation of the scene as depicted in the current input image.

In particular, the system 100 generates a 3D point cloud $Q_t$ for the current input image $X_t$ based on the depth map $D_t$ of the input image $X_t$. Each image pixel at coordinate (i, j) with a corresponding estimated depth value $D_t^{ij}$ can be projected into the structured 3D point cloud $Q_t$ as follows:

$$Q_t^{ij} = D_t^{ij} \cdot K^{-1} [i,j,1]^T, \qquad (1)$$

where K is a camera intrinsic matrix, and [i,j,1] are homogeneous coordinates iterating over all locations in the depth map $D_t$. The system 100 then attaches to each coordinate i, j in $Q_t^{ij}$ the one-hot segmentation vector at the same coordinates in $S^{ij}$.

The system 100 processes the sequence of input images 102 using the ego-motion estimation neural network 108 to generate, for each pair of two consecutive input images in the sequence, a respective ego-motion output that characterizes motion of the camera between the two consecutive input images. In particular, the ego-motion output is an ego-motion vector that defines rotation and translation of the camera from its point of view while taking the first image in the pair of two consecutive input images to its point of view while taking the second image in the pair. For example, the ego-motion vector includes three values for three translation components $t_x$, $t_y$, $t_z$ and three values for three rotation components $r_x$, $r_y$, $r_z$.

The ego-motion estimation neural network 108 is configured to process each pair of images (e.g., $X_{t-9}$ and $X_{t-6}$, $X_{t-6}$ and $X_{t-3}$, $X_{t-3}$ and $X_t$) in the sequence to generate a respective camera motion output in accordance with current values of motion parameters of the ego-motion estimation neural network 108. For example, as illustrated by FIG. 1, the ego-motion estimation neural network 108 processes two images $X_{t-3}$ and $X_t$, which are taken by the camera at times t−3 and t, respectively, to generate a camera motion output 116, denoted as $T_{t-3 \to t}$, that represents the camera's movement (rotation and translation) from time t−3 to time t.

In some implementations, the ego-motion estimation neural network 108 includes one or more convolutional neural network layers.

The depth estimation neural network 106 and ego-motion estimation neural network 108 can be jointly trained on training data using an unsupervised learning technique. In particular, during training, current values of the parameters of the depth estimation neural network 106 and ego-motion estimation neural network 108 are jointly adjusted to optimize the same objective function (e.g., by backpropagating an estimate of a gradient of the objective function). In some implementations, the depth estimation neural network 106 and ego-motion estimation neural network 108 can be trained concurrently and end-to-end with the segmentation neural network 104. In some other implementations, for the sake of modularity and simplicity, the depth estimation neural network 106 and ego-motion estimation neural network 108 can be trained separately from the segmentation neural network 104. The training of these neural networks can be performed by a training engine, for example, training engine 126. Generally, the training engine 126 will be implemented as one or more software modules or components, installed on one or more computers in one or more locations. In some cases, one or more computers will be dedicated to a particular engine; in other cases, multiple engines can be installed and running on the same computer or computers.

Example architectures of the depth estimation neural network 106 and ego-motion estimation neural network 108 are described in R. Mahjourian, M. Wicke, and A. Angelova. Unsupervised learning of depth and ego-motion from monocular video using 3d geometric constraints. In The IEEE Conference on Computer Vision and Pattern Recognition (CVPR), June 2018.

Given the prior ego-motion outputs from previous images in the sequence 102, e.g., until current image $X_t$, the system 100 uses a future ego-motion prediction neural network 110 to generate a future ego-motion output (e.g., output 118) that is a prediction of future motion of the camera from the current image $X_t$ in the sequence to a future image, e.g., image $X_{t+3}$.

In particular, the future ego-motion prediction neural network 110 is configured to process the prior ego-motion outputs (e.g., $T_{t-3j-3 \to t-3j}$, $j \in \{0,1,2\}$) to generate a future ego-motion output (e.g., $\hat{T}_{t \to t+3}$) in accordance with current values of future ego-motion parameters of the future ego-motion prediction neural network 110.

The future ego-motion prediction neural network 110 is a recurrent neural network that includes a plurality of Long Short-Term Memory (LSTM) neural network layers.

The architecture of the future ego-motion prediction neural network 110 is described in more detail below with reference to FIG. 2.

The system 100 processes the point cloud 120 of the current input image and the future ego-motion output 118 to generate a future point cloud 122 that is a predicted 3D representation of a future scene as depicted in the future image. For example, the future point cloud of the future image $X_{t+3}$ can be determined as follows:

$$\hat{Q}_{t+3}^{ij} = \hat{T}_{t \to t+3} Q_t^{ij} \quad (2)$$

where $\hat{Q}_{t+3}^{ij}$ denotes the future point cloud of the future image $X_{t+3}$ with corresponding segmentation vectors at coordinates i, j.

The system 100 then processes the future point cloud 122 to generate a predicted segmentation map 124 for potential objects in the future scene depicted in the future image.

For example, to generate the predicted segmentation map for the future image $X_{t+3}$, the system 100 projects the future point cloud to a two-dimensional (2D) space and uses the attached segmentation vectors to construct the predicted segmentation map for the future image $X_{t+3}$ by using forward warp:

$$\hat{S}_{t+3}^{\hat{i}\hat{j}} = \hat{S}_t^{ij}, \quad (3)$$

where the coordinates $\hat{i}, \hat{j}$ are determined by:

$$[\hat{i}, \hat{j}, 1]^T = K \hat{Q}_{t+3}^{ij}. \quad (4)$$

The 2D space can be, for example, a plane that is at a predetermined distance from the camera and is orthogonal to the camera's principal axis.

The system 100 can predict a segmentation map at larger time horizons, e.g., predicting $S_{t+3p}$ with $p \in \{2, 3, 4, 5, \ldots\}$, by repeatedly applying the above transformation as follows:

$$\hat{Q}_{t+3s+3}^{ij} = \hat{T}_{t+3s \to t+3s+3} \hat{Q}_{t+3s}^{ij}, \quad (5)$$

where s=1, 2, 3, etc. $\hat{T}_{t+3s \to t+3s+3}$ can be generated by processing prior ego-motion outputs and one or more newly predicted future ego-motion outputs using the future ego-motion prediction neural network 110. For example, the neural network 110 can take $T_{t-9 \to t-6}$, $T_{t-6 \to t-3}$, $T_{t-3 \to t}$, $\hat{T}_{t \to t+3}$ as input and process the input to generate the next future ego-motion output $\hat{T}_{t+3 \to t+6}$. Similarly, the neural network 110 can take $T_{t-9 \to t-6}$, $T_{t-6 \to t-3}$, $T_{t-3 \to t}$, $\hat{T}_{t \to t+3}$, $\hat{T}_{t+3 \to t+6}$ as input and process the input to generate the next future ego-motion output $\hat{T}_{t+6 \to t+9}$. It is noted that Equation 5 is the same as Equation 2 when s=0. Thus, the system 100 generates predicted segmentation maps for future images without ever needing to predict pixel intensities of the future images.

The system 100's capabilities to predict segmentation maps at large time horizons are useful in many situations. For example, using the predicted segmentation maps, the system 100 can generate multiple future images ahead and use them for early detection of anomalies or surprising outcomes. In particular, the system 100 can compare predicted future images with actually observed images and analyze the mismatches in the scene topology or appearance. Large mismatches may be an indication of an object moving with an unexpected velocity, and can be used as informing signals for safer navigation of the object.

Figure 2:
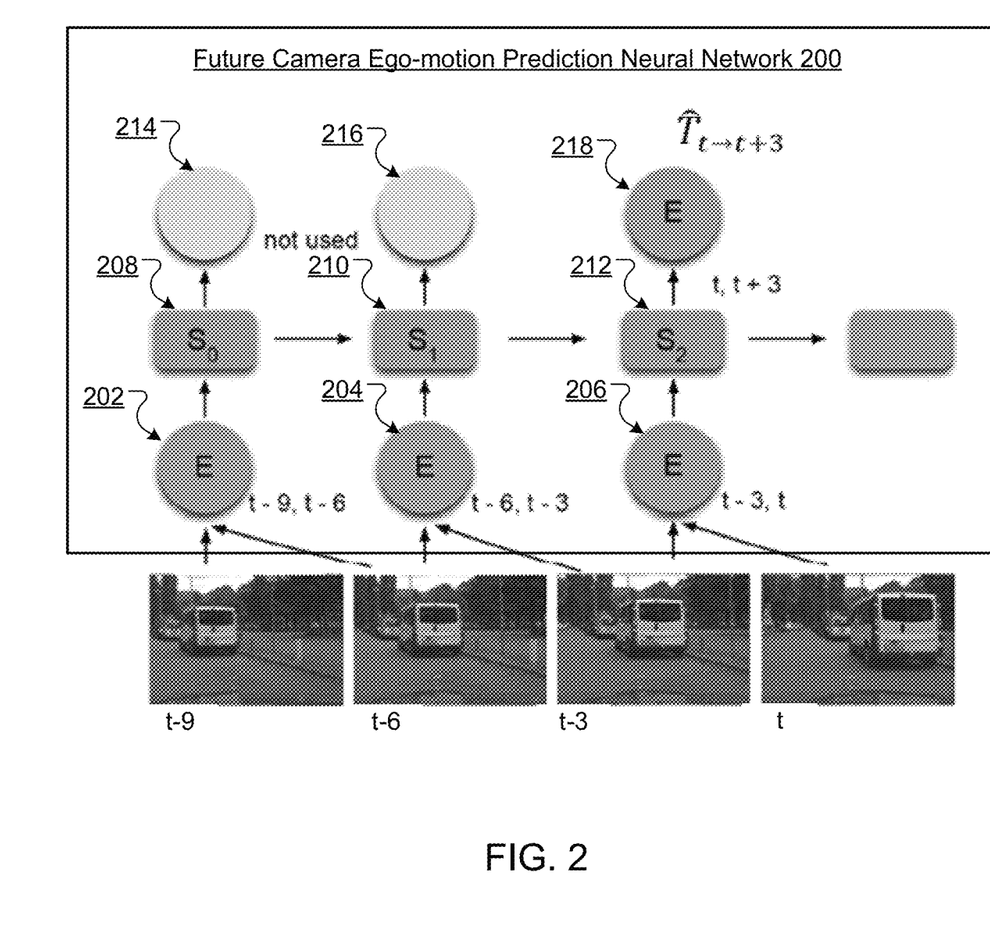
FIG. 2 is a block diagram of an example architecture of a future ego-motion prediction neural network.

FIG. 2 is a block diagram of an example architecture of a future ego-motion prediction neural network 200 (hereafter referred to as "the neural network 200" for simplicity).

The neural network 200 is a recurrent neural network that includes a plurality of LSTM neural network layers (also referred to as "LSTM layers"). For example, as shown in FIG. 2, the neural network 200 includes three LSTM layers 208, 210, and 212. Each LSTM layer has a respective hidden state that is updated at each time step. For example, LSTM layer 208 has hidden state $S_0$, LSTM layer 210 has hidden state $S_1$, and LSTM layer 212 has hidden state $S_2$. Each LSTM layer has a LSTM cell with six units corresponding to a six dimensional (6D) ego-motion vector. The 6D ego-motion vector has three values for three translation components $t_x$, $t_y$, $t_z$ and three values for three rotation components $r_x$, $r_y$, $r_z$.

The neural network 200 is configured to receive a plurality of input ego-motion vectors derived from previous images, e.g., $T_{t-9 \to t-6}$, $T_{t-6 \to t-3}$, $T_{t-3 \to t}$, and to process the input ego-motion vectors to generate a future ego-motion output (e.g., $\hat{T}_{t \to 5+3}$) in accordance with current values of future ego-motion parameters of the neural network 200. The future ego-motion output is a prediction of future motion of the camera from the current image $X_t$ in the sequence to a future image, e.g., image $X_{t+3}$.

In other words, given the prior ego-motion vectors $T_{t-3j-3 \to t-3j}$, $j \in \{0,1,2\}$, the neural network 110 aims to produce a prediction for future ego-motion as:

$$\hat{T}_{t \to t+3} = \mu(T_{t-3 \to t}, T_{t-3 \to t}, T_{t-3 \to t}), \quad (6)$$

where $\mu$ is a nonlinear function, which can be learned from an observed ego-motion sequences as described in more detail below.

At each time step, each of the LSTM layers of the neural network 200 is configured to receive a respective input ego-motion vector and a respective previous hidden state from the preceding LSTM layer. The LSTM cell of the current LSTM layer then processes the respective input ego-motion vector and the respective previous hidden state received from the preceding LSTM layer to update the current hidden state of the current LSTM layer and to generate an output ego-motion vector for the current LSTM layer. If the current LSTM layer is the first LSTM layer, the LSTM cell processes only the respective input ego-motion vector to update the current hidden state of the current LSTM layer and to generate an output ego-motion vector for the current LSTM layer. The LSTM cell of the current LSTM layer then passes the updated hidden state to the next LSTM cell of the next LSTM layer for processing. The process continues until the last LSTM cell of the last LSTM layer in the neural network 200 generates its output ego-motion vector. The output ego-motion vector of the last LSTM layer is the future ego-motion output. For example, as shown in FIG. 2, the output ego-motion vector 218 of LSTM layer 212 is the future ego-motion output $\hat{T}_{t \to t+3}$.

To train the neural network 200 (i.e., to learn the $\mu$ function), a training engine, for example, the training engine 116 of FIG. 1, obtains a sequence of estimated future ego-motions from the ego-motion estimation neural network 108 as training data. For example, given a sequence of images $X_{t-9}$, $X_{t-6}$, $X_{t-3}$, $X_t$, $X_{t+3}$ where $X_{t+3}$ is available at the time of training, the ego-motion estimation neural network 108 can generate estimated future ego-motions $T_{t-9 \to t-6}$, $T_{t-6 \to t-3}$, $T_{t-3 \to t}$, and $T_{t \to t+3}$ for the training. The training engine 116 then adjusts the future ego-motion parameters of the future ego-motion prediction neural network 200 to minimize a loss function between the estimated future ego-motion $T_{t \to t+3}$ and the RNN-predicted future ego-motion $\hat{T}_{t \to t+3}$. The RNN-predicted future ego-motion $\hat{T}_{t \to t+3}$ is generated by the future ego-motion prediction neural network 200 as described in Equation 6 above. The loss function can be expressed as follows:

$$\mathcal{L}_{\ell_1}(\hat{T}_{t \to t+3}, T_{t \to t+3}) = \sum_{i=1}^{6} \|T_{t \to t+3_i} - \hat{T}_{t \to t+3_i}\| \quad (7)$$

In contrast to prior work which learn a function directly from past scenes to the future scene and must develop the concept of motion from scratch, in this disclosure, future ego-motion is learned as a sequence of transforms which are a function of the prior ego-motion trajectory. By incorporating 3D structure as a rotation and translation transform (also referred to as "an SE3 transform"), the techniques described herein allows for faster and more efficient training of the future ego-motion prediction neural network 200.

In addition, because no ground-truth ego-motions are used for the training, i.e., only the estimated ego-motions by ego-motion estimation NN 108 are used, the future ego-motion prediction NN 110 can be trained using an unsupervised method from a sequence of input images. Therefore, no additional supervision or sensors are necessary. This ensures that training data for the training is readily available, i.e., because large quantities of unlabeled monocular video can be easily gathered during the course of normal operation of an agent.

Figure 3:
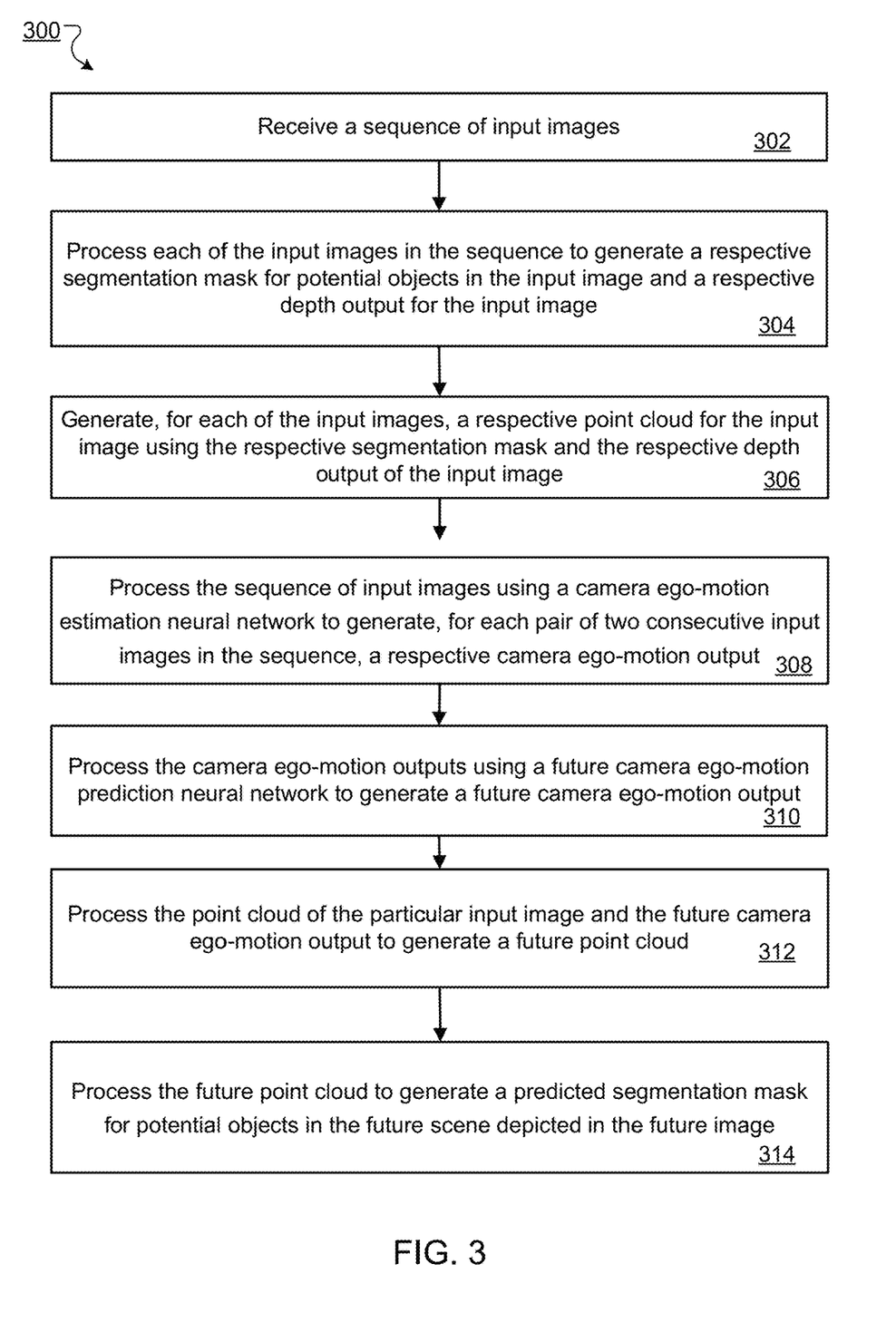
FIG. 3 is a flow diagram of an example process for processing a sequence of images to generate a predicted segmentation of a future image.

FIG. 3 is a flow diagram of an example process for processing a sequence of images to generate a predicted segmentation of a future image. For convenience, the process 300 will be described as being performed by a system of one or more computers located in one or more locations. For example, an future segmentation prediction system, e.g., the future segmentation prediction system 100 of FIG. 1, appropriately programmed in accordance with this specification, can perform the process 300.

The system receives a sequence of input images that depict the same scene (step 302). The sequence of input images is captured by a camera at different time steps. For example, the sequence of input images are frames of a video captured by a camera.

In some other implementations, to predict future segmentations at large time horizons, the system can receive input images that are frames of video separated by a fixed number of time intervals, in which the fixed number is greater than one. For example, the system can receive a sequence of input images that are frames of video separated by three, five, nine, or ten time intervals.

The sequence of input images includes a current input image and one or more input images preceding the current input image in the sequence. In some implementations, the sequence of input images comprises the current input image and three or more images preceding the current input image in the sequence.

The system processes the current input image to generate a segmentation map for potential objects in the current input image and a respective depth map for the current input image (step 304).

In particular, the system processes the current input image using a segmentation neural network to generate the segmentation map for potential objects in the current input image in accordance with current values of parameters of the segmentation neural network. The segmentation map of the current input image includes, for each pixel of a plurality of pixels in the current input image, an estimated probability distribution over a predefined number of object classes that represents, for each predefined object class, a respective probability that the pixel belongs to the predefined object class.

The system processes the current input image using a depth estimation neural network to generate the depth map for the current input image in accordance with current values of parameters of the depth estimation neural network. The depth map includes an estimated depth value for each pixel of a plurality of pixels in the current input image that represents a respective distance of a scene depicted at the pixel from a focal plane of the current input image.

The system generates a point cloud for the current input image using the segmentation map and the depth map of the current input image (step 306). The point cloud is a 3-dimensional (3D) structure representation of the scene as depicted in the current input image. For example, the system can generate a point cloud for the current input image using Equation 1 above.

The system processes the sequence of input images using an ego-motion estimation neural network to generate, for each pair of two consecutive input images in the sequence, a respective ego-motion output that characterizes motion of the camera between the two consecutive input images in accordance with current values of parameters of the ego-motion estimation neural network (step 308). For each pair of input images, the respective ego-motion output characterizes motion of the camera between the two input images is an ego-motion vector that defines rotation and translation of the camera from its point of view while taking one input image to its point of view while taking the other input image. The ego-motion vector includes three values for three translation components and three values for three rotation components.

The system processes the ego-motion outputs using a future ego-motion prediction neural network to generate a future ego-motion output that is a prediction of future motion of the camera from the current input image in the sequence to a future image (step 310). The future image is an image that would be captured by the camera at a future time step.

The future ego-motion prediction neural network is a recurrent neural network that is configured to receive as input the plurality of ego-motion outputs and to generate the future ego-motion output that is the prediction of future motion of the camera from the current input image to the future image in accordance with current values of parameters of the future ego-motion prediction neural network. The recurrent neural network includes a plurality of Long Short-Term Memory (LSTM) neural network layers. The future ego-motion prediction neural network has been trained using an unsupervised learning technique.

The system processes the point cloud of the current input image and the future ego-motion output to generate a future point cloud that is a predicted 3D representation of a future scene as depicted in the future image (step 312).

The system processes the future point cloud to generate a predicted segmentation map for potential objects in the future scene depicted in the future image (step 314).

For example, the system projects the future point cloud to a two-dimensional plane to obtain projected points in the plane. The projected points form the predicted segmentation map for potential objects in the future scene depicted in the future image. The two-dimensional plane is at a predetermined distance from the camera and is orthogonal to principal axis of the camera.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more non-transitory storage devices storing instructions that, when executed by one or more computers, cause the one or more computers to perform operations comprising:

receiving a sequence of input images that depict a same scene, the input images being captured by a camera at different time steps, the sequence of input images comprising a current input image and one or more input images preceding the current image in the sequence;

processing the current input image to generate a segmentation map for potential objects in the current input image and a respective depth map for the current input image, wherein the segmentation map includes, for each pixel of a plurality of pixels in the current input image, a first estimated probability distribution over a plurality of object classes that represents, for each of the plurality of object classes, a respective probability that the pixel belongs to the object class;

generating a point cloud for the current input image using the segmentation map and the depth map of the current input image, wherein the point cloud is a 3-dimensional (3D) structure representation of the scene as depicted in the current input image;

processing the sequence of input images using an ego-motion estimation neural network in accordance with current values of motion parameters of the ego-motion estimation neural network to generate, for each pair of two consecutive input images in the sequence, a respective ego-motion output that characterizes motion of the camera between the two consecutive input images;

processing the ego-motion outputs generated by the ego-motion estimation neural network using a future ego-motion prediction neural network in accordance with current values of future ego-motion parameters of the future ego-motion prediction neural network to generate a future ego-motion output that is a prediction of future motion of the camera from the current input image in the sequence to a future image, wherein the future image is an image that would be captured by the camera at a future time step;

processing the point cloud of the current input image and the future ego-motion output to generate a future point cloud that is a predicted 3D representation of a future scene as depicted in the future image; and processing the future point cloud to generate a predicted segmentation map for potential objects in the future scene depicted in the future image, wherein the predicted segmentation map includes, for each pixel of a plurality of pixels in the future image, a second estimated probability distribution over the plurality of object classes that represents, for each of the plurality of object classes, a respective probability that the pixel belongs to the object class.

2. The system of claim 1, wherein the sequence of input images comprises the current input image and three or more images preceding the current input image in the sequence.

3. The system of claim 1, wherein the sequence of input images are frames of a video captured by the camera, wherein the frames of the video are separated by a fixed number of time intervals, wherein the fixed number is greater than one.

4. The system of claim 3, wherein the fixed number of time intervals includes three time intervals.

5. The system of claim 1, wherein the future time step is three time steps in the future with respect to the time step at which the current input image is captured.

6. The system of claim 1, wherein the operations for processing the current input image to generate the segmentation map for potential objects in the current input image and the respective depth map for the current input image comprises:

processing the current input image using a segmentation neural network to generate the segmentation map for potential objects in the current input image, and processing the current input image using a depth estimation neural network to generate the depth map for the current input image.

7. The system of claim 1, wherein processing the future point cloud to generate the predicted segmentation map for potential objects in the future scene depicted in the future image comprises:

projecting the future point cloud to a two-dimensional plane to obtain projected points in the plane, wherein the projected points form the predicted segmentation map for potential objects in the future scene depicted in the future image, and wherein the two-dimensional plane is at a predetermined distance from the camera and is orthogonal to principal axis of the camera.

8. The system of claim 1, wherein the future ego-motion prediction neural network is a recurrent neural network that is configured to receive as input the plurality of ego-motion outputs and to generate the future ego-motion output that is the prediction of future motion of the camera from the current input image in the sequence to the future image.

9. The system of claim 8, wherein the recurrent neural network includes a plurality of Long Short-Term Memory (LSTM) neural network layers.

10. The system of claim 1, wherein the future ego-motion prediction neural network has been trained using an unsupervised learning technique.

11. The system of claim 1, wherein the depth map comprises an estimated depth value for each pixel of a plurality of pixels in the current input image that represents a respective distance of a scene depicted at the pixel from a focal plane of the current input image.

12. The system of claim 1, wherein for each pair of input images, the respective ego-motion output characterizes motion of the camera between the two input images is an ego-motion vector that defines rotation and translation of the camera from its point of view while taking one input image to its point of view while taking the other input image.

13. The system of claim 12, wherein the ego-motion vector includes three values for three translation components and three values for three rotation components.

14. The system of claim 1, wherein the future ego-motion output is a predicted ego-motion vector that would define rotation and translation of the camera from its point of view while taking the current input image to its predicted point of view while taking the future image.

15. The system of claim 1, wherein the segmentation neural network comprises one or more convolutional neural network layers.

16. The system of claim 1, wherein the depth estimation neural network comprises one or more convolutional neural network layers.

17. The system of claim 1, wherein the ego-motion estimation neural network comprises one or more convolutional neural network layers.

18. The system of claim 1, wherein the ego-motion estimation neural network and the depth prediction neural network have been jointly trained using an unsupervised learning technique.

19. The system of claim 1, wherein the ego-motion estimation neural network, the depth prediction neural network, and the segmentation neural network have been jointly trained using an unsupervised learning technique.

20. One or more non-transitory computer storage media encoded with instructions that, when executed by one or more computers, cause the one or more computers to perform operations comprising:

receiving a sequence of input images that depict a same scene, the input images being captured by a camera at different time steps, the sequence of input images comprising a current input image and one or more input images preceding the current image in the sequence;

processing the current input image to generate a segmentation map for potential objects in the current input image and a respective depth map for the current input image, wherein the segmentation map includes, for each pixel of a plurality of pixels in the current input image, a first estimated probability distribution over a plurality of object classes that represents, for each of the plurality of object classes, a respective probability that the pixel belongs to the object class;

generating a point cloud for the current input image using the segmentation map and the depth map of the current input image, wherein the point cloud is a 3-dimensional (3D) structure representation of the scene as depicted in the current input image;

processing the sequence of input images using an ego-motion estimation neural network in accordance with current values of motion parameters of the ego-motion estimation neural network to generate, for each pair of two consecutive input images in the sequence, a respective ego-motion output that characterizes motion of the camera between the two consecutive input images;

processing the ego-motion outputs generated by the ego-motion estimation neural network using a future ego-motion prediction neural network in accordance with current values of future ego-motion parameters of the future ego-motion prediction neural network to generate a future ego-motion output that is a prediction of future motion of the camera from the current input image in the sequence to a future image, wherein the future image is an image that would be captured by the camera at a future time step;

processing the point cloud of the current input image and the future ego-motion output to generate a future point cloud that is a predicted 3D representation of a future scene as depicted in the future image; and processing the future point cloud to generate a predicted segmentation map for potential objects in the future scene depicted in the future image, wherein the predicted segmentation map includes, for each pixel of a plurality of pixels in the future image, a second estimated probability distribution over the plurality of object classes that represents, for each of the plurality of object classes, a respective probability that the pixel belongs to the object class.

21. A computer-implemented method comprising:

receiving a sequence of input images that depict a same scene, the input images being captured by a camera at different time steps, the sequence of input images comprising a current input image and one or more input images preceding the current image in the sequence;

processing the current input image to generate a segmentation map for potential objects in the current input image and a respective depth map for the current input image, wherein the segmentation map includes, for each pixel of a plurality of pixels in the current input image, a first estimated probability distribution over a plurality of object classes that represents, for each of the plurality of object classes, a respective probability that the pixel belongs to the object class;

generating a point cloud for the current input image using the segmentation map and the depth map of the current input image, wherein the point cloud is a 3-dimensional (3D) structure representation of the scene as depicted in the current input image;

processing the sequence of input images using an ego-motion estimation neural network in accordance with current values of motion parameters of the ego-motion estimation neural network to generate, for each pair of two consecutive input images in the sequence, a respective ego-motion output that characterizes motion of the camera between the two consecutive input images;

processing the ego-motion outputs generated by the ego-motion estimation neural network using a future ego-motion prediction neural network in accordance with current values of future ego-motion parameters of the future ego-motion prediction neural network to generate a future ego-motion output that is a prediction of future motion of the camera from the current input image in the sequence to a future image, wherein the future image is an image that would be captured by the camera at a future time step;

processing the point cloud of the current input image and the future ego-motion output to generate a future point cloud that is a predicted 3D representation of a future scene as depicted in the future image; and processing the future point cloud to generate a predicted segmentation map for potential objects in the future scene depicted in the future image, wherein the predicted segmentation map includes, for each pixel of a plurality of pixels in the future image, a second estimated probability distribution over the plurality of object classes that represents, for each of the plurality of object classes, a respective probability that the pixel belongs to the object class.

22. The method of claim 21, wherein the sequence of input images comprises the current input image and three or more images preceding the current input image in the sequence.

23. The method of claim 21, wherein the sequence of input images are frames of a video captured by the camera, wherein the frames of the video are separated by a fixed number of time intervals, wherein the fixed number is greater than one.

24. The method of claim 21, wherein the future time step is three time steps in the future with respect to the time step at which the current input image is captured.

25. The method of claim 21, wherein processing the current input image to generate the segmentation map for potential objects in the current input image and the respective depth map for the current input image comprises:

processing the current input image using a segmentation neural network to generate the segmentation map for potential objects in the current input image, and processing the current input image using a depth estimation neural network to generate the depth map for the current input image.

26. The method of claim 21, wherein processing the future point cloud to generate the predicted segmentation map for potential objects in the future scene depicted in the future image comprises:

projecting the future point cloud to a two-dimensional plane to obtain projected points in the plane, wherein the projected points form the predicted segmentation map for potential objects in the future scene depicted in the future image, and wherein the two-dimensional plane is at a predetermined distance from the camera and is orthogonal to principal axis of the camera.

27. The method of claim 21, wherein the future ego-motion prediction neural network is a recurrent neural network that is configured to receive as input the plurality of ego-motion outputs and to generate the future ego-motion output that is the prediction of future motion of the camera from the current input image in the sequence to the future image.

28. The method of claim 21, wherein for each pair of input images, the respective ego-motion output characterizes motion of the camera between the two input images is an ego-motion vector that defines rotation and translation of the camera from its point of view while taking one input image to its point of view while taking the other input image.

29. The method of claim 21, wherein the future ego-motion output is a predicted ego-motion vector that would define rotation and translation of the camera from its point of view while taking the current input image to its predicted point of view while taking the future image.

* * * * *